US008787117B2

(12) United States Patent
Kandori

(10) Patent No.: US 8,787,117 B2
(45) Date of Patent: Jul. 22, 2014

(54) ELECTROMECHANICAL TRANSDUCER

(75) Inventor: Atsushi Kandori, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 13/566,308

(22) Filed: Aug. 3, 2012

(65) Prior Publication Data

US 2013/0064035 A1 Mar. 14, 2013

(30) Foreign Application Priority Data

Sep. 8, 2011 (JP) ................................ 2011-195785

(51) Int. Cl.
*G03B 42/06* (2006.01)

(52) U.S. Cl.
USPC .......................................................... 367/189

(58) Field of Classification Search
USPC ............................................. 367/189, 140, 7
See application file for complete search history.

(56) References Cited

U.S. PATENT DOCUMENTS

| | | | | |
|---|---|---|---|---|
| 7,149,442 | B2 | 12/2006 | Ushijima et al. | |
| 7,382,137 | B2 | 6/2008 | Ushijima et al. | |
| 7,741,851 | B2 | 6/2010 | Ushijima et al. | |
| 8,176,780 | B2 | 5/2012 | Takagi et al. | |
| 8,336,380 | B2 | 12/2012 | Kandori et al. | |
| 8,339,014 | B2 | 12/2012 | Kandori et al. | |
| 2008/0264167 | A1 | 10/2008 | Kandori et al. | |
| 2011/0031568 | A1 | 2/2011 | Kandori et al. | |
| 2011/0169510 | A1 | 7/2011 | Kandori et al. | |
| 2011/0182149 | A1* | 7/2011 | Kandori et al. | 367/189 |
| 2012/0103096 | A1 | 5/2012 | Kandori | |
| 2012/0194107 | A1* | 8/2012 | Kandori et al. | 318/116 |
| 2012/0218867 | A1 | 8/2012 | Kandori et al. | |
| 2013/0064035 | A1* | 3/2013 | Kandori | 367/189 |

OTHER PUBLICATIONS

Knight, J., et al.,"Low Temperature Fabrication of Capacitive Micromachined Ultrasonic Immersion Wave Transducers on Silicon and Dielectric Substrates", IEEE Transactions on Ultrasonics, Ferroelectrics, Frequency Control, vol. 51, No. 10, pp. 1324-1333 (2004).

* cited by examiner

*Primary Examiner* — Daniel Pihulic
(74) *Attorney, Agent, or Firm* — Fitzpatrick, Cella, Harper & Scinto

(57) ABSTRACT

An electromechanical transducer according to an embodiment of the present invention is capable of selectively performing a transmitting and receiving operation by using elements of different shapes. The electromechanical transducer has a plurality of cells, each of which has a vibrating film including two electrodes provided with a gap therebetween, two driving and detecting units, a potential difference setter, and a switch. Each of the driving and detecting units implements a transmitting and/or a receiving function. A first or second element includes first or second electrodes which are electrically connected and further connected to the common first or second driving and detecting unit, respectively. The potential difference setter sets a predetermined potential difference between the reference potentials of the first and second driving and detecting units, respectively, and the switch switches between the first and second driving and detecting units to perform the transmitting and receiving operation.

12 Claims, 10 Drawing Sheets

ELECTROMECHANICAL TRANSDUCER

BACKGROUND OF THE INVENTION

1. Field of the Invention

The present invention relates to an electromechanical transducer, such as a capacitive electromechanical transducer, which performs the transmission and reception of elastic waves, including ultrasonic waves (the term "transmission and reception" in the present description means at least one of the transmission and the reception).

2. Description of the Related Art

For the purpose of transmitting and receiving ultrasonic waves, a capacitive micromachined ultrasonic transducer (CMUT), which is a capacitive ultrasonic transducer, has been proposed. The CMUT is fabricated by a microelectromechanical systems (MEMS) process, which uses a semiconductor process. FIG. 10 is a schematic sectional view of an array CMUT in Knight J, McLean J, and Degertekin F L, "Low temperature fabrication of capacitive micromachined ultrasonic immersion wave transducers on silicon and dielectric substrates", IEEE Trans. Ultrason., Ferroelect., Freq. Contr. Vol. 51, No. 10, pp. 1324-1333), 2004. In FIG. 10, reference numeral 101 denotes a vibrating film, reference numeral 102 denotes a first electrode (upper electrode), reference numeral 103 denotes supporting portions, reference numeral 104 denotes a gap, reference numeral 105 denotes a second electrode (lower electrode), reference numeral 106 denotes a substrate, and reference numeral 107 denotes an insulating film. The first electrode 102 is deposited on the vibrating film 101, and the vibrating film 101 is disposed on the substrate by being supported by the supporting portions 103 formed on the substrate 106. The second electrode 105 is disposed on the substrate 106 at a position where it opposes the first electrode 102 on the vibrating film 101 with the gap 104 (normally ranging from tens of nm to hundreds of nm) provided therebetween. The constitution comprising the vibrating film 101 and the first and the second electrodes opposing each other with the gap 104 provided therebetween is defined as one set and referred to as a cell 200. Either the first electrodes or the second electrodes are electrically interconnected and have a common potential. The electrodes sharing the common potential are referred to as common electrodes. In this case, a description will be given of a constitution in which the second electrodes 105 are the common electrodes. The second electrodes (common electrodes) 105 are connected by a wire 108 to a potential difference setter 121 capable of applying a desired potential, and a predetermined DC potential difference is set between the second electrodes 105 and the opposing first electrodes 102. Of the first and the second electrodes, the electrodes that are not the common electrodes are electrically connected for each given cell group and carry the same potential. The given cell group is referred to as an element 201, which indicates the unit of device that transmits and receives elastic waves. In the following description, the electrodes carrying the same potential for each cell group (element) will be referred to as signal electrodes. In this case, the description will be given of a configuration in which the first electrodes 102 are the signal electrodes. The first electrodes (signal electrodes) 102 of each element are connected to a driving and detecting unit 122 by a wire 109. The insulating films 107 are deposited on the substrate 106 to provide insulation between the substrate 106 and the wires, so that the wiring between the signal electrodes of different elements or the wiring of the common electrodes are electrically isolated.

At least either a transmitting operation or a receiving operation can be accomplished by operating the driving and detecting unit 122. The transmitting operation is an operation in which the driving and detecting unit 122 generates an AC voltage and applies the AC voltage to the first electrodes (the signal electrodes) so as to generate an AC electrostatic attractive force between the first and the second electrodes 102 and 105, thereby vibrating the vibrating films 101 formed integral with the first electrodes 102 to transmit an elastic wave to the outside. Meanwhile, the receiving operation is an operation to receive an elastic wave, which vibrates the first electrodes 102 formed integral with the vibrating films 101, thereby detecting the magnitude of a received elastic wave. More specifically, the capacitance between the first and the second electrodes 102 and 105, respectively, changes due to the vibration of the vibrating films 101, and the magnitude of a current generated by a changing electric charge induced in the first electrodes (the signal electrodes) is detected by the driving and detecting unit 122 so as to detect the magnitude of the elastic wave.

In the configuration described above, an element as the device unit for transmitting and receiving elastic waves depends on the area in which the signal electrodes are electrically connected, so that the shape of the element cannot be changed. On the other hand, in the case of transmitting and receiving elastic waves, the optimal shape of the element varies according to an application for which the element is used (e.g., the measurement of the elastic waves of different objects). For this reason, it is not easy to use an electromechanical transducer having an element with a fixed shape for different applications.

SUMMARY OF THE INVENTION

In view of the problem described above, an electromechanical transducer in accordance with the present invention has the following characteristics. The transducer has a plurality of cells, each of which has a vibrating film that includes a first electrode and a second electrode provided opposing the first electrode with a gap therebetween, a driving and detecting means, a potential difference setter, and a switch. The driving and detecting means includes a first and a second driving and detecting means for implementing at least one of a transmitting function which generates an AC potential between the first and the second electrodes to vibrate the vibrating film and a receiving function which detects a displacement of the vibrating film by a change in a capacitance between the first and the second electrodes. Among the plurality of cells, at least two cells having the first electrodes thereof electrically connected and then connected to the same first driving and detecting means constitute one group, which in turn constitutes a first element. Similarly, among the plurality of cells, at least two cells having the second electrodes thereof electrically connected and then connected to the same second driving and detecting means constitutes one group, which constitutes a second element. A plurality of at least one of the first and the second elements is provided. Further, the potential difference setter sets a predetermined potential difference between reference potentials for implementing the functions in the first and the second driving and detecting means, and the switch switches the driving and detecting means for implementing the function between the first and the second driving and detecting means at the time of carrying out the transmitting or the receiving operation.

The electromechanical transducer in accordance with the present invention has a device which switches the electrodes for transferring drive and detection signals between the electrodes of the first cell group (the first element) and the electrodes of the second cell group (the second element) and actuate the selected ones when carrying out the transmitting or the receiving operation. This arrangement makes it possible to selectively perform the transmitting and the receiving operations by elements having different shapes.

Further features of the present invention will become apparent from the following description of exemplary embodiments with reference to the attached drawings.

DESCRIPTION OF THE EMBODIMENTS

The following will describe embodiments of the present invention. An important point of the present invention is that the transducer in accordance with the present invention is operated by switching the driving and detecting units and the electrodes for transferring drive and detection signals between those belonging to a first cell group (a first element) and those belonging to a second cell group (a second element) when carrying out a transmitting and receiving operation. Based on this concept, an electromechanical transducer in accordance with the present invention has a basic configuration which has been described in relation to the means for solving the problem.

The following will describe in detail embodiments of the electromechanical transducer in accordance with the present invention with reference to the accompanying drawings.

First Embodiment

Figure 1:
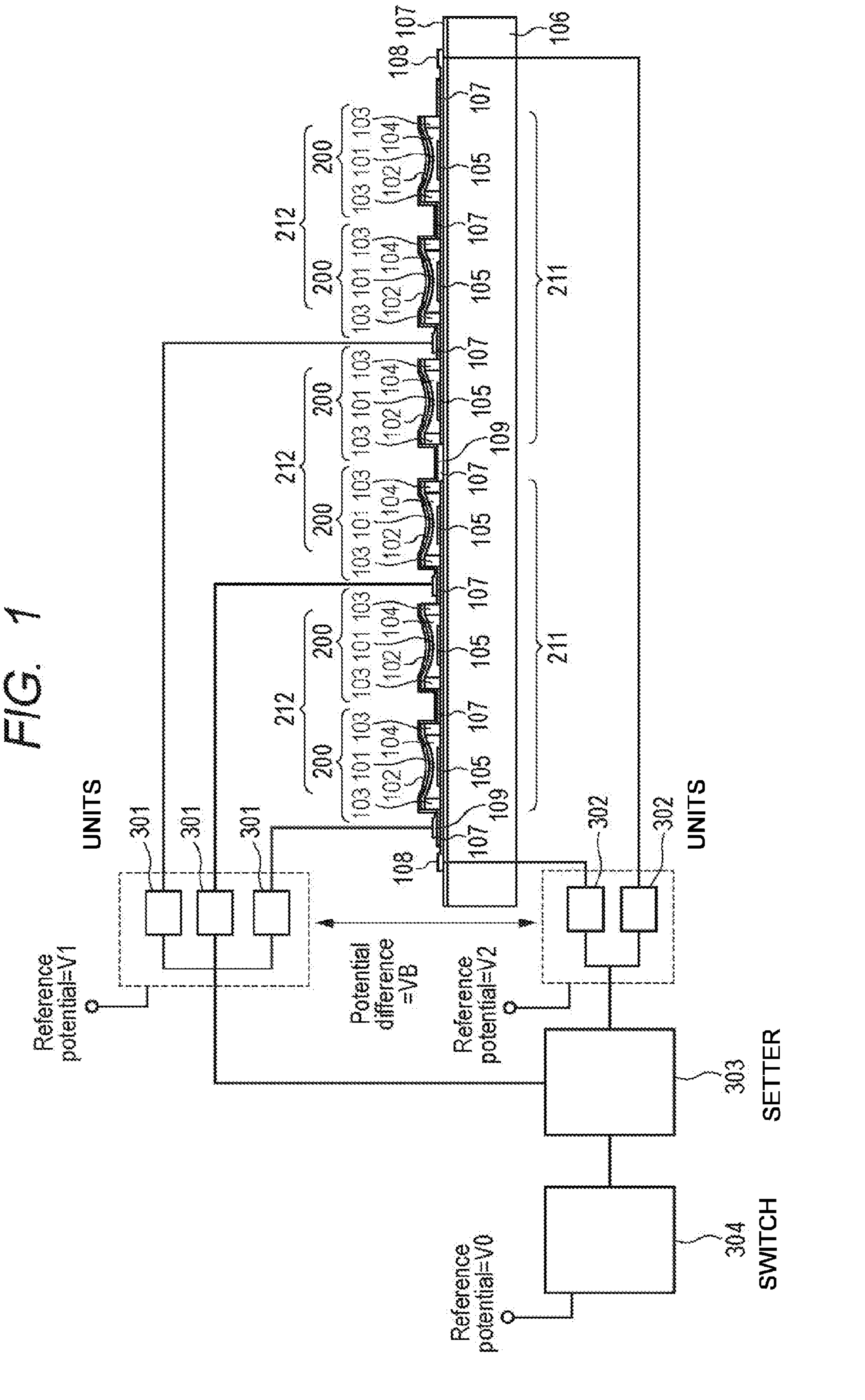
FIG. 1 is a diagram illustrating an electromechanical transducer according to a first embodiment.
Figure 10:
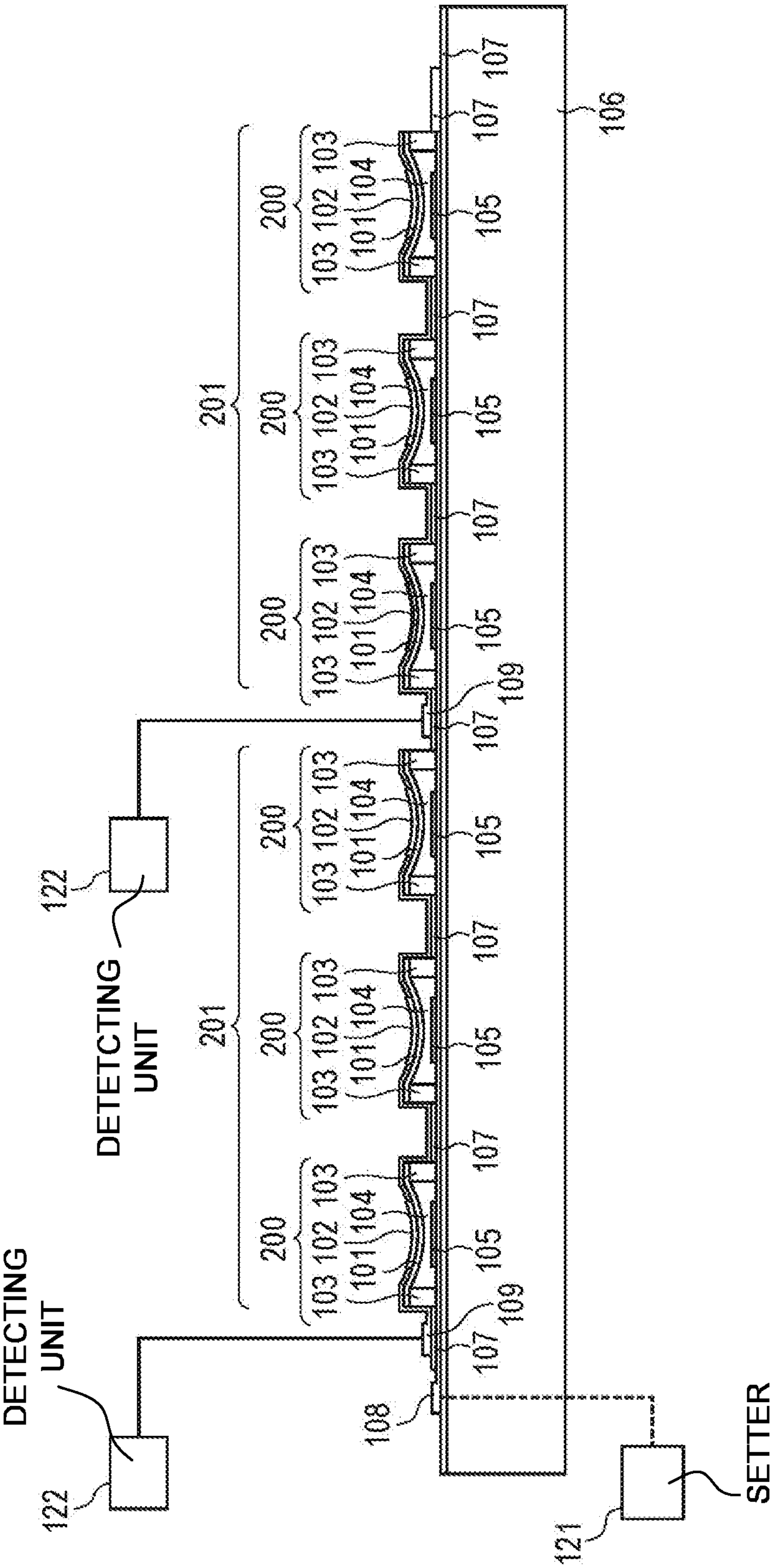
FIG. 10 is a diagram illustrating a conventional capacitive electromechanical transducer.

FIG. 1 is a schematic sectional view of an array CMUT of a first embodiment. Referring to FIG. 1, the like numbers as those in FIG. 10 described above denote the like functional elements. Reference numeral 301 denotes a first driving and detecting unit and reference numeral 302 denotes a second driving and detecting unit. Further, a potential difference setter 303 sets a potential difference between reference potentials carried by the first and the second driving and detecting unit to implement their functions, and a switch 304 switches the driving and detecting unit to be actuated between the first driving and detecting unit and the second driving and detecting unit when carrying out the transmitting or the receiving operation. The first electrodes are electrically connected for each first group and have the same potential. Hereinafer, this group will be referred to as a first element 212. The second electrodes are electrically connected for each second group and have the same potential. Hereinafer, this group will be referred to as a second element 211. The present embodiment is characterized in that, in the cells 200 existing in an area X constituting the first element 212 and the cells 200 existing in an area Y constituting the second element 211, there are cells that are included in only one element. In other words, the area X with the first element 212 disposed therein and the area Y with the second element 211 disposed therein have portions that do not overlap.

The first electrodes 102 of each element 212 are drawn out of the substrate 106 by the wire 109 of the first electrode and connected to the first driving and detecting unit 301. The second electrodes 105 of each element 211 are drawn out of the substrate 106 by the wire 108 of the second electrode and connected to the second driving and detecting unit 302. Thus, the electromechanical transducer according to the present embodiment has the same number of the first driving and detecting unit 301 as the number of the first elements 212 (three in FIG. 1), and the same number of the second driving and detecting unit 302 as the number of the second elements 211 (two in FIG. 1). The driving and detecting unit 301 and 302 have reference potentials V1 and V2, respectively, for operating the electrodes of each element, which are connected to transfer drive and detection signals, on the basis of predetermined potentials. In a plurality of the first driving and detecting unit 301, the reference potentials V1 used to generate drive signals or output detection signals are all set to the same potential. Hence, the potentials of the first electrodes 102 are normally fixed to the reference potential V1. Similarly, the reference potentials V2 of a plurality of the second driving and detecting units 302 are all set to the same potential. Hence, the potentials of the second electrodes 105 are normally fixed to the reference potential V2.

The reference potential V1 carried by the first driving and detecting unit 301 and the reference potential V2 carried by the second driving and detecting unit 302 are set to have a predetermined potential difference VB therebetween by the potential difference setter 303. Normally, therefore, the potential V1 of the first electrodes 102 and the potential V2 of the second electrodes 105 have the potential difference VB. When actuating the CMUT, in order to enhance the efficiency of transmitting and receiving elastic waves, the predetermined potential difference VB is applied between two electrodes, and the electrostatic attractive force generated between the electrodes causes the vibrating film 101 to sag toward the substrate 106. In the case of transmitting elastic waves, the electrostatic attractive force is inversely proportional to the square of distance, meaning that a shorter distance between electrodes leads to higher efficiency. Meanwhile, in the case of receiving elastic waves, the magnitude of a detected minute current attributable to the displacement of the vibrating film is inversely proportional to the distance between electrodes whereas proportional to a potential difference between electrodes. Hence, shortening the distance between electrodes and increasing the potential difference VB lead to higher efficiency. The predetermined potential difference VB can be set between the first and the second electrodes 102 and 105 by the potential difference setter 303, thus permitting efficient transmitting and receiving operations even when the transmitting and receiving operations are carried out using elements of different shapes.

When one of the first and the second driving and detecting units 301 and 302 is carrying out the drive and detection operation, the other carries out an operation for fixing the potential of the electrodes connected thereto at the reference potential of a driving and detecting unit. The switch 304 determines which of the first and the second driving and detecting units 301 and 302 should carry out the transmitting or receiving operation and then switches to the determined one. The driving and detecting unit transmits a drive signal and captures a detection signal. If the first driving and detecting unit 301 is selected to carry out the transmitting and receiving operation, then for each first element, the application of a drive signal or the detection of an induced current is performed on the first electrodes 102. The second driving and detecting unit 302 is not carrying out the driving and detection operation (at rest) and all the second electrodes 105 opposing the first electrodes 102 have the reference potential V2, thus functioning as the common electrodes having the uniform DC potential. This arrangement makes it possible to carry out the transmitting and receiving operations, taking the first element as one unit, and the shape of the first element provides the unit of the device that carries out the transmission and reception.

Meanwhile, if the second driving and detecting unit 302 is selected to carry out the driving and detecting operation, then the application of a drive signal or the detection of an induced current is performed on the second electrodes 102 for each element. Regarding the first electrodes 102 opposing the second electrodes 105, the first driving and detecting unit 301 is not carrying out the driving and detecting operation (at rest) and all the first electrodes 102 have the reference potential V1, thus functioning as the common electrodes having the uniform DC potential. This arrangement makes it possible to carry out the transmitting and receiving operations, taking the second element as one unit, and the shape of the second element provides the unit of the device that carries out the transmission and reception.

According to the present invention, the first element and the second element are disposed in different shapes so as to provide portions that do not overlap. This makes it possible to change the shape of the element in charge of the transmitting and receiving operations, depending on whether the first element is selected as the transmitting and receiving device unit or the second element is selected as the transmitting and receiving device unit. Thus, the driving and detecting unit to perform the driving and detecting operation is switched between the first driving and detecting unit 301 and the second driving and detecting unit 302 by the switch 304, thus allowing the transmitting and receiving operations to be accomplished by element units having different shapes, with the electrical connection of the electrodes remaining fixed. In other words, the present embodiment is capable of changing the element shape simply by switching (selecting) the electrodes that transfer the drive and detection signals between the first electrode group and the second electrode group. Hence, changes in characteristics between the elements and the wires are less, permitting good transmitting and receiving characteristics, as compared with, for example, a configuration adapted to switch a plurality of wires between the driving and detecting unit and the electrodes by switches.

Second Embodiment

Figure 2A:
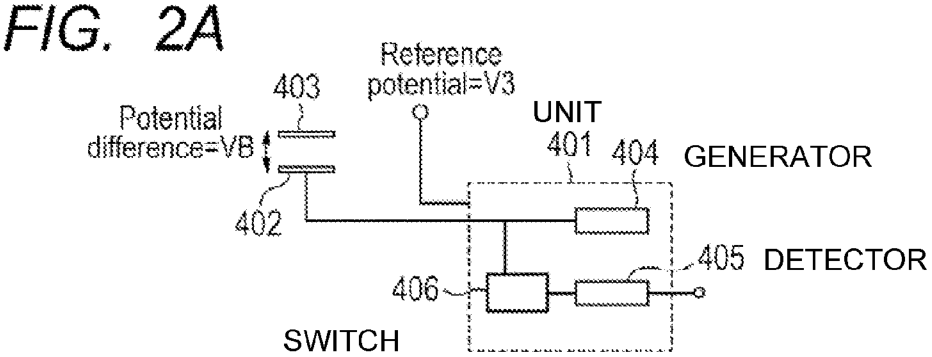
FIG. 2A is a diagram illustrating an electromechanical transducer according to a second embodiment.
Figure 2B:
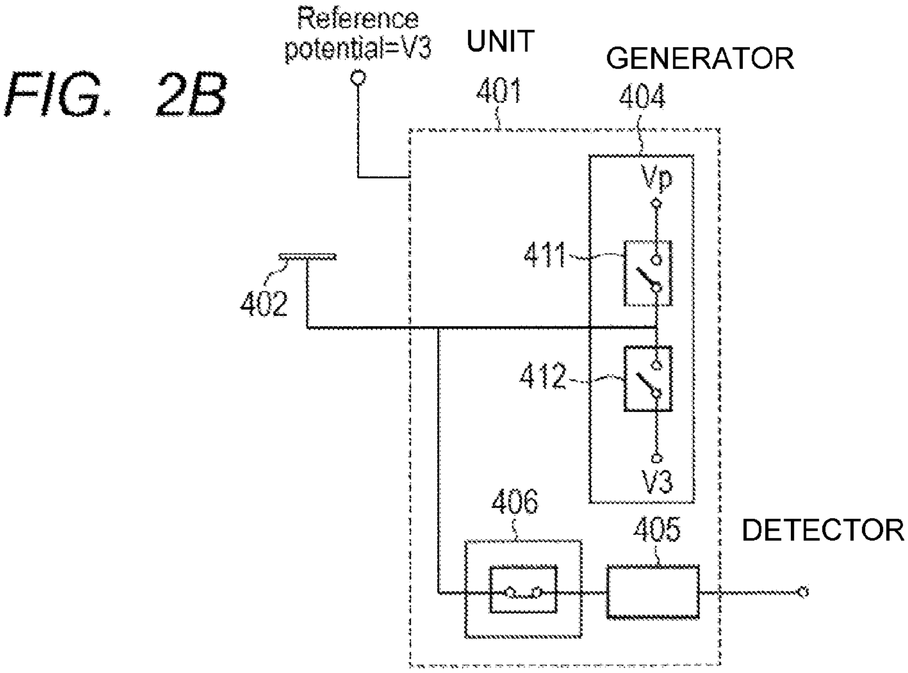
FIG. 2B is another diagram illustrating the electromechanical transducer according to the second embodiment.
Figure 2C:
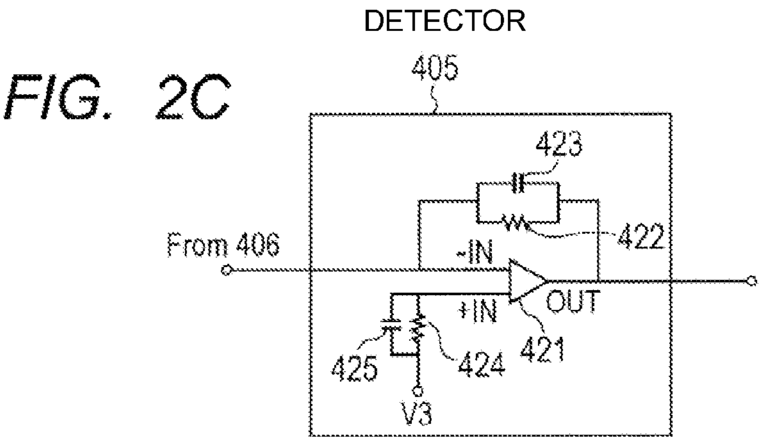
FIG. 2C is still another diagram illustrating the electromechanical transducer according to the second embodiment.

Referring now to FIGS. 2A to 2C, a second embodiment will be described. The second embodiment relates to the configurations of a first driving and detecting unit 301 and a second driving and detecting unit 302, and the rest is the same as the configuration of the first embodiment. In the present embodiment, the first driving and detecting unit 301 and the second driving and detecting unit 302 will be described as a driving and detecting unit 401, and the reference potential of the driving and detecting unit 401 will be referred to as V3. Further, an electrode connected to an operating driving and detecting unit will be referred to as a signal electrode 402, while the other electrode will be referred to as a common electrode 403.

FIG. 2A is a schematic diagram illustrating the driving and detecting unit 401 of the present embodiment. The driving and detecting unit 401 includes, for transmitting and receiving elastic waves, an AC potential generator 404 which drives a CMUT, a current detector 405 which detects a change in the capacitance (induced current) of the CMUT, and a protection switch 406. When transmitting an elastic wave, the AC potential generator 404 connected to the signal electrode 402 applies an AC potential based on the reference potential V3 to the signal electrode 402. This produces an AC potential difference between the signal electrode 402 and the common electrode 403, causing an AC electrostatic attractive force to be generated in the vibrating film 101. At this time the protection switch 406 connected to the signal electrode 402 turns off thereby to protect an input portion of the current detector 405 from the potential generated by the AC potential generator 404. The vibrating film 101 vibrates by the electrostatic attractive force generated as described above, enabling the CMUT to transmit the elastic wave.

FIG. 2B is a schematic diagram illustrating a specific example of the AC potential generator 404. In a simplest configuration, the AC potential generator 404 can be implemented by disposing switches 411 and 412 between an output terminal (the terminal connected to the signal electrode 402) and the reference potential V3 and between the output terminal and a predetermined AC voltage potential Vp, respectively. In this case, the AC voltage potential Vp is generated on the basis of the reference potential V3. At the time of transmission, only the switch 412 disposed between the output terminal and the reference potential V3 is turned on at first, the output terminal being set at the reference potential V3. Only while the AC potential is being applied, the switch 412 disposed between the output terminal and the reference potential V3 is turned off, while the switch 411 disposed between the output terminal and the AC voltage potential Vp is turned on. After predetermined time elapses, the switch 411 between the output terminal and the AC voltage potential Vp is turned off, the switch 412 between the output terminal and the reference potential V3 is turned on, and the output terminal is set to the reference potential V3. This allows the AC voltage potential Vp to be applied to the output terminal for predetermined time.

Meanwhile, at the time of receiving an elastic wave, the output terminal of the AC potential generator 404 is placed in a high impedance state (a state in which the potential is not fixed), thus not influencing the potential of the signal electrode 402. The high impedance state can be easily set by turning off (opening) all the switches 411 and 412 connected to the output terminal. On the other hand, the protection switch 406 is turned on, causing the signal electrode 402 and the input portion of the current detector 405 to be connected. At this time, the vibration of the vibrating film 101 caused by an elastic wave applied from outside changes the capacitance between the signal electrode 402 and the common electrode 403. The common electrode 403 is fixed to a certain potential, and there is the potential difference VB between the electrodes, so that a minute current passes through the wire of the signal electrode 402 due to the induced charge generated at the signal electrode 402. The magnitude of the elastic wave that has caused the change in the capacitance can be detected by detecting the change in the minute current by the current detector 405. At this time, the potential of the signal electrode 402 is substantially fixed to the reference potential V3 by the current detector 405, and only the current is taken out. In this case, strictly speaking, although the potential of the signal electrode 402 slightly fluctuates (about tens of mV at a maximum) during the current detecting operation, the fluctuation is extremely small in comparison with the potential difference VB between the electrodes (about tens of volts to hundreds of volts). Hence, an influence on the change in the capacitive attractive force can be ignored.

FIG. 2C is a schematic diagram illustrating a specific example of the current detector 405. The current detector 405 can be constituted by a transimpedance circuit using an operational amplifier. Regarding an output terminal (OUT) of an operational amplifier 421, a resistor 422 and a capacitor 423, which are connected in parallel, are connected to an inverting input terminal (−IN), and an output signal thereof is fed back. A non-inverting input terminal (+IN) of the operational amplifier 421 is connected to a reference potential V3 terminal through a resistor 424 and a capacitor 425 connected in parallel. A positive power source VDD (not shown) and a negative power source VSS (not shown) that supply electric power to the operational amplifier 421 have the reference potential terminals thereof set to the reference potential V3. This arrangement makes it possible to take out an input current as an output voltage without causing substantially no change in the potential at the terminal connected to the signal electrode 402. When no driving and detecting operation for transmission and reception is being carried out (i.e., a non-operation state), the reference potential V3 is directly applied as a DC potential to the signal electrode 402 by the AC potential generator 404 (a state in which the switch 411 is off, while the switch 412 is on). At this time, the protection switch 406 connected to the signal electrode 402 turns off, and the input portion of the current detector 405 and the signal electrode 402 are not connected.

Using the driving and detecting unit of the present embodiment is capable of starting or stopping the driving and detecting operation for transmission and reception by the simple configuration, thus permitting easy switching between the elements to be actuated. The operation when the driving and detecting operation is not being carried out (the non-operation state) has been described in relation to the configuration in which the DC potential is applied by the AC potential generator 404; however, the operation is not limited thereto. As an alternative arrangement, the AC potential generator 404 may be set to a high impedance state and the protection switch 406 may be turned on to fix the reference potential V3 by the current detector 405. In other words, in this arrangement, if the switching unit switches to the first driving and detecting unit for carrying out the transmitting and receiving operation, then the second driving and detecting unit fixes the second electrode to the reference potential of the second driving and detecting unit. Further, at the same time, the first electrodes are connected, by each first element, to a drive circuit that implements the transmitting function of the first driving and detecting unit or a detection circuit that implements the receiving function by the first driving and detecting unit. Meanwhile, if the switching unit switches to the second driving and detecting unit at the time of the transmitting and receiving operation, then the first electrodes are fixed by the first driving and detecting unit to the reference potential of the first driving and detecting unit. Further, at the same time, the second electrodes are connected, by each second element, to a drive circuit that implements the transmitting function of the second driving and detecting unit or a detection circuit, which implements the receiving function, by the second driving and detecting unit.

Third Embodiment

Figure 3:
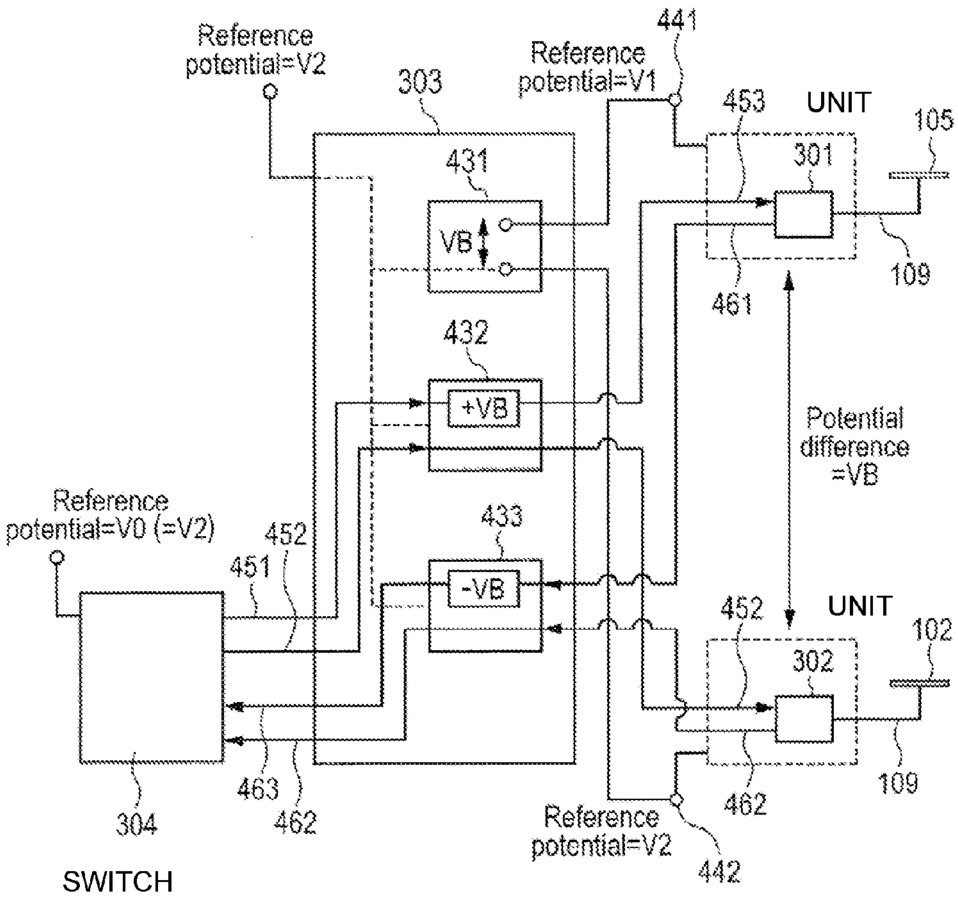
FIG. 3 is a diagram illustrating an electromechanical transducer according to a third embodiment.

Referring now to FIG. 3, a third embodiment will be described. The third embodiment relates to a potential difference setter 303. The rest is the same as one of the embodiments described above. The potential difference setter 303 according to the present embodiment characteristically includes a DC power source 431, a drive control signal level converter 432, and a detection signal level converter 433. According to the present invention, there is a plurality of at least one of a first driving and detecting unit 301 and a second driving and detecting unit 302. However, for simplifying the description, FIG. 3 illustrates only one each of the first driving and detecting unit 301 and the second driving and detecting unit 302, on which the description will be based.

The potential difference setter 303 is required to operate to generate a predetermined potential difference VB between a reference potential V1 of the first driving and detecting unit 301 and a reference potential V2 carried by the second driving and detecting unit 302. For this purpose, two terminals of a DC power source 431 are connected to a reference potential terminal 441 (reference potential V1) of the first driving and detecting unit 301 and a reference potential terminal 442 (reference potential V2) of the second driving and detecting unit 302, respectively. This makes it possible to easily accomplish the setting of the potential difference VB by controlling the potential difference generated by the DC power source 431. The first driving and detecting unit 301 operates on the basis of the reference potential V1, while the second driving and detecting unit 302 operates on the basis of the reference potential V2, so that the potential difference VB can be produced between two electrodes 102 and 105 simply by applying a DC potential between the terminals, namely, 441 and 442.

For the purpose of explanation, a case will be discussed where a reference potential V0 of a switching unit 304 is V2. The switching unit 304 outputs drive signals 451 and 452 to the driving and detecting unit 301 and 302, respectively, and also captures detection signals 461 and 462 from the driving and detecting units 301 and 302, respectively. The drive signal 451 is changed to a drive signal 453 (level shift) by increasing the reference potential by VB by the level converter 432 of drive control signals. The drive signal 453, which has undergone the level shift, is input as a signal for controlling the drive to the first driving and detecting unit 301. Further, the detection signal 461 output from the first driving and detecting unit 301 is changed to a detection signal 463 (level shift) by decreasing the reference potential by VB by the level converter 433 of detection signals.

Since the reference potentials of the first and the second driving and detecting units 301 and 302 are set to be different by the potential difference setter 303, the level of a signal transferred by the driving and detecting units deviates by the potential difference VB. The potential difference VB takes an extremely large value ranging from about tens of volts to about hundreds of volts, as compared with regular digital control signals or analog signals. Therefore, if the control signals or the detection signals are transferred to and from the switching unit 304, using either the reference potential V1 or V2 (also V0 in this description) as the reference potential, then the signal level difference increases, preventing successful transfer. The present embodiment has the level converter 432 of drive control signals and the level converter 433 of detection signals. This permits easy transfer of the drive control signals 453 and 452 and the detection signals 463 and 462 on the basis of the reference potential of the switching unit 304. According to the present embodiment, the use of the DC power source combined with a plurality of level shifters allows different reference potentials to be easily generated and permits smooth transfer of input/output signals to and from outside, thus making it possible to securely switch by the switching unit 304 between the elements to be operated.

Fourth Embodiment

Figure 4A:
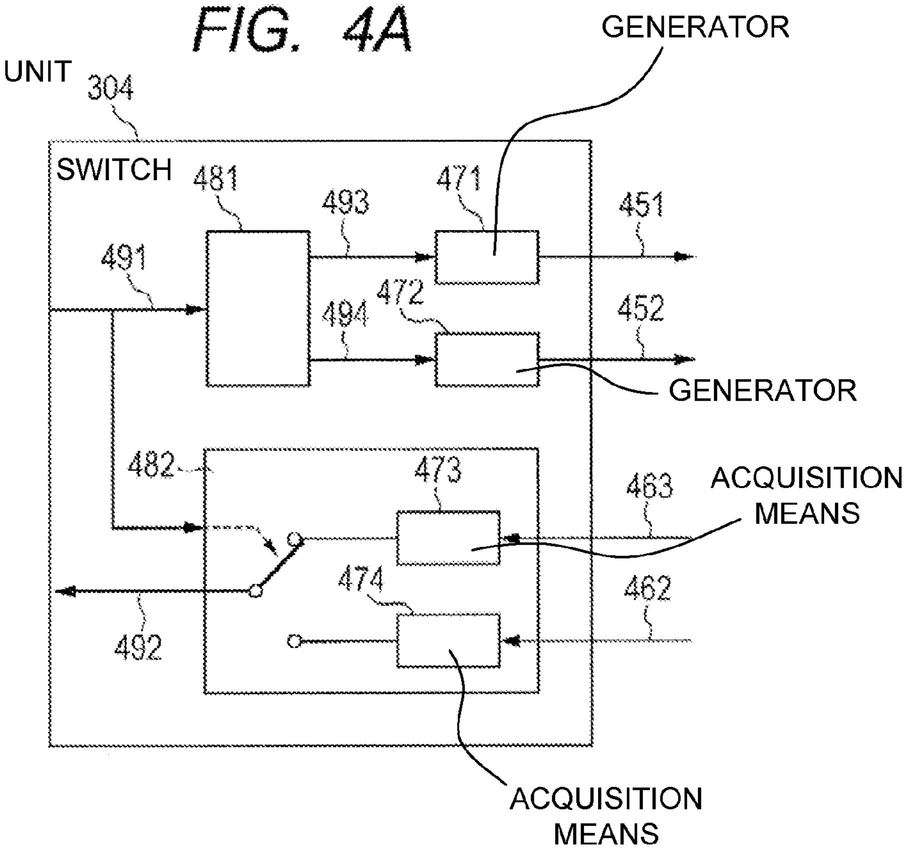
FIG. 4A is a diagram illustrating an electromechanical transducer according to a fourth embodiment.

Referring now to FIG. 4A, a fourth embodiment will be described. The fourth embodiment relates to a switching unit 304. The rest is the same as the configuration of any one of the first to the third embodiments. FIG. 4A is a schematic diagram illustrating the switching unit 304. The switching unit 304 includes a first signal generator 471, a second signal generator 472, a first detection signal acquisition means 473, a second detection signal acquisition means 474, a drive control switch 481, a signal switch 482, a selection signal 491, and a selection detection signal 492. Based on the selection signal 491 received from outside, the switching unit 304 switches the electrodes that are to transfer drive and detection signals for a transmitting and receiving operation between a first electrode group (the electrodes of a first element) and a second electrode group (the electrodes of a second element)

First, a case where the first element is used to perform the transmitting and receiving operation. Referring to FIG. 4A, when the selection signal 491 that has selected the operation by the first element is input to the switching unit 304, the drive control switch 481 issues command signals 493 and 494. The command signal 493 to the first signal generator 471 instructs the first driving and detecting unit 301 to carry out the transmitting and receiving operation, and generates the drive control signal 451 (refer to 453 in FIG. 3) in the first signal generator 471. Meanwhile, the command signal 494 to the second signal generator 472 instructs the second driving and detecting unit 302 to remain at rest and generates the drive control signal 452 in the second signal generator 472. Further, the signal switch 482, which has received the selection signal 491 that has selected the operation of the first element, selects the detection signal 463 (refer to 461 in FIG. 3) output from the first driving and detecting unit 301 and outputs the selected detection signal 463 as the selection detection signal 492 to outside. Meanwhile, a detection signal 462 output from the second driving and detecting unit 302 is supplied to the signal switch 482, but not output to outside.

A description will now be given of the case where the transmitting and receiving operation is carried out by the second element. When the selection signal 491 that has selected the operation by the second element is input to the switching unit 304, the drive control switch 481 issues the command signals 493 and 494. The command signal 493 to the first signal generator 471 instructs the first driving and detecting unit 301 to remain at rest, while the first signal generator 451 generates a drive control signal 451 (453). Meanwhile, the command signal 494 to the second signal generator 472 instructs the second driving and detecting unit 302 to carry out the transmitting and receiving operation, and generates the drive control signal 452 at the second signal generator 472. Further, the signal switch 482 that has received the selection signal 491 that has selected the operation by the second element selects the detection signal 462 output from the second driving and detecting unit 302 and outputs the selected detection signal as a detection signal 492 to outside. Meanwhile, the detection signal 463 (461) output from the first driving and detecting unit 301 is supplied to the signal switch 482, but is not output to outside.

As described above, switching the drive and detection signals by using the switching unit 304 of the present embodiment makes it possible to perform the transmitting and receiving operation by switching the element, which is to perform the transmitting and receiving operation, between the first element and the second element.

Fifth Embodiment

Figure 4B:
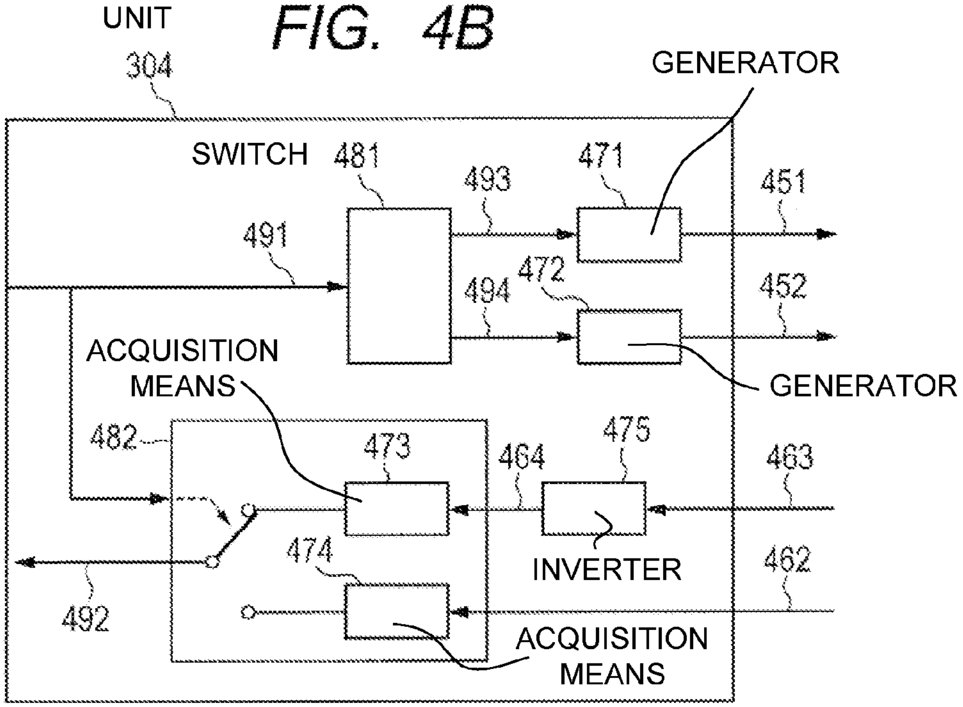
FIG. 4B is a diagram illustrating an electromechanical transducer according to a fifth embodiment.

Referring now to FIG. 4B, a fifth embodiment will be described. The fifth embodiment relates to the processing of detection signals in a switching unit 304. The rest is the same as the configuration of the fourth embodiment. The present embodiment is characteristic in that the switching unit 304 has a detection signal polarity inverter 475. The polarity inverter 475 inverts the polarity of the detection signal 463 (461) about a reference potential V2, and outputs the inverted signal as a polarity inverted detection signal 464. The polarity inverted detection signal 464 is input to the signal switch 482 in place of the detection signal 463 (461) output from the first driving and detecting unit 301.

Even when a vibrating film 101 is vibrated by an elastic wave, the detection signal 463 (461) from the first element and the detection signal 462 from the second element can be set to the same polarity by the polarity inverter 475. According to the present invention, there is a predetermined potential difference VB between the reference potential of the first element and the reference potential of the second element. Assuming that a potential of V1 of the first element is higher than a potential V2 of the second element by VB. Then, the potential of the first element observed when taking the second element as the reference is +VB, while the potential of the second element observed when taking the first element as the reference is −VB, meaning opposite polarities. When receiving an elastic wave, a minute current to be detected is proportional to the potential difference VB between the electrodes. Hence, if the polarity of the potential difference is different, then a detection signal with a reversed polarity is output. In the present embodiment, the switching unit 304 has a polarity inverter 475, thus making it possible to set the output signal 461 from the first element and the output signal 462 from the second element to the same polarity.

In the present embodiment, the polarity inverter 475 has been described that it has the switching unit 304; however, its configuration is not limited thereto. The polarity inverter 475 may alternatively be configured like the first driving and detecting unit 301 or the second driving and detecting unit 302. Further alternatively, the polarity inverter 475 may be configured like the potential difference setter 303 or the detection signal level converter 433 therein (refer to FIG. 3). As still another alternative, the configuration of a means itself that transfers the selection signal 491 and the selection detection signal 492 to and from an electromechanical transducer.

Sixth Embodiment

Figure 5A:
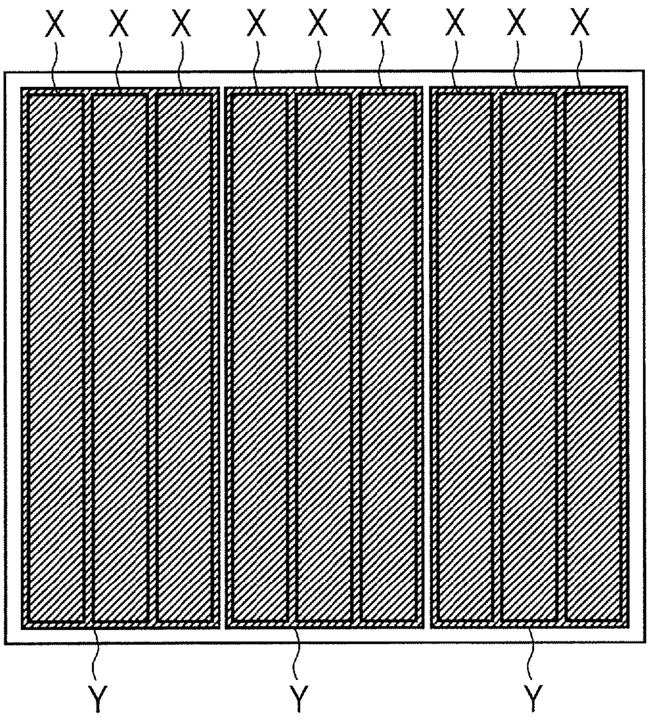
FIG. 5A is a diagram illustrating an electromechanical transducer according to a sixth embodiment.

Referring now to FIG. 5A, a sixth embodiment will be described. The sixth embodiment relates to the shapes of elements. The rest is the same as the configuration of one of the first to the fifth embodiments.

FIG. 5A is a diagram schematically illustrating regions X of a first element and regions Y (the hatched region) of a second element observed from above a substrate 106. Although the edges of the regions X and the regions Y are slightly shifted in FIG. 5A for easier observation, the edges actually coincide with each other.

The first element regions X are rectangular and arranged one-dimensionally, whereas the second element regions Y have a slightly larger rectangular shape and are arranged one-dimensionally. Each element is formed of, for example, a plurality of cells (each of which has first and second electrodes provided with a gap therebetween), which are disposed two-dimensionally. In this case, the width of the short side of each first element is smaller than the short side of each second element. Switching the transmitting and receiving operation between the first element and the second element makes it possible to carry out the transmitting and receiving operation by a one-dimensional array having a different width. This means that the optimal width of the one-dimensional array changes according to the frequency domain of an elastic wave to be transmitted or received, and the present embodiment is capable of switching the width of the element according to the frequency to be used. Thus, the present embodiment makes it possible to provide a capacitive electromechanical transducer capable of switching the width of the element of the one-dimensional array, which is to carry out the transmitting and receiving operation, according to the frequency of an elastic wave to be transmitted or received.

Seventh Embodiment

Figure 5B:
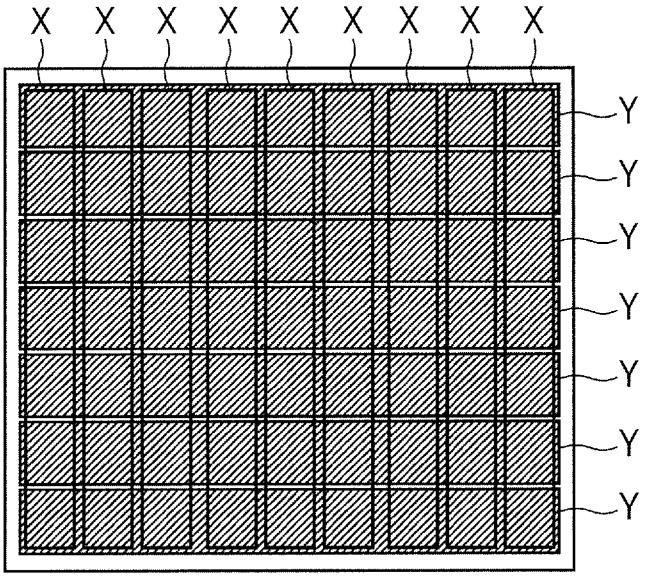
FIG. 5B is a diagram illustrating an electromechanical transducer according to a seventh embodiment.

Referring now to FIG. 5B, a seventh embodiment will be described. The seventh embodiment relates also to the shapes of elements. The rest is the same as the configurations of one of the first to the fifth embodiments. FIG. 5B is also a diagram schematically illustrating first element regions X and second element regions Y (the hatched region) observed from above a substrate 106. Although the edges of the regions X and the regions Y are slightly shifted also in FIG. 5B for easier observation, the edges actually coincide with each other.

In the present embodiment, a plurality of first element regions X are rectangular and one-dimensionally arranged, and a plurality of second element regions Y are rectangular and one-dimensionally arranged such that the direction of the long side thereof is orthogonal to the direction of the long side of the regions X. The transmitting and receiving operation of the one-dimensional array can be accomplished by switching the direction in which an elastic wave is transmitted or received by switching the element to perform the transmitting and receiving operation between the first element and the second element, which are orthogonal to each other. Thus, the present embodiment makes it possible to provide a capacitive electromechanical transducer capable of switching the array direction of the element of the one-dimensional array which is to perform the transmitting and receiving operation.

Eighth Embodiment

Figure 6:
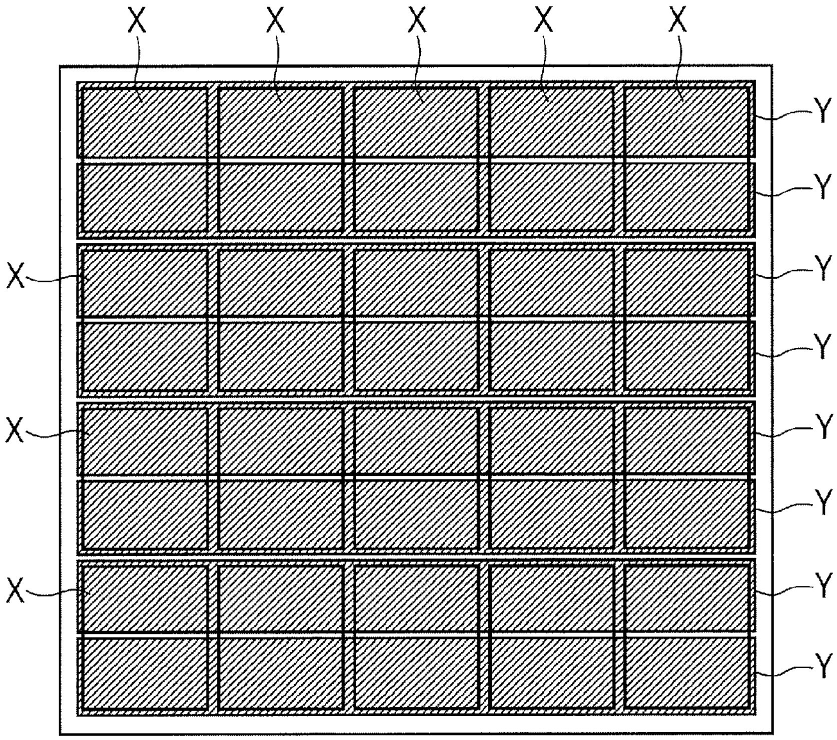
FIG. 6 is a diagram illustrating an electromechanical transducer according to an eighth embodiment.

Referring now to FIG. 6, an eighth embodiment will be described. The eighth embodiment relates also to the shapes of elements. The rest is the same as the configuration of one of the first to the fifth embodiments. FIG. 6 is also a diagram schematically illustrating first element regions X and second element regions Y (the hatched region) observed from above a substrate 106. Although the edges of the regions X and the regions Y are slightly shifted also in FIG. 6 for easier observation, the edges actually coincide with each other.

First element regions X are square and two-dimensionally arranged, while second element regions Y are rectangular and one-dimensionally arranged. The transmitting and receiving operation can be performed by switching between the two-dimensional array element and the one-dimensional array element in the same capacitive electromechanical transducer by switching the element that is to carry out the transmitting and receiving operation between the first element and the second element. Thus, the present embodiment makes it possible to provide a capacitive electromechanical transducer capable of switching between the transmitting and receiving operation by the two-dimensional array and the one by the one-dimensional array.

Ninth Embodiment

Figure 7:
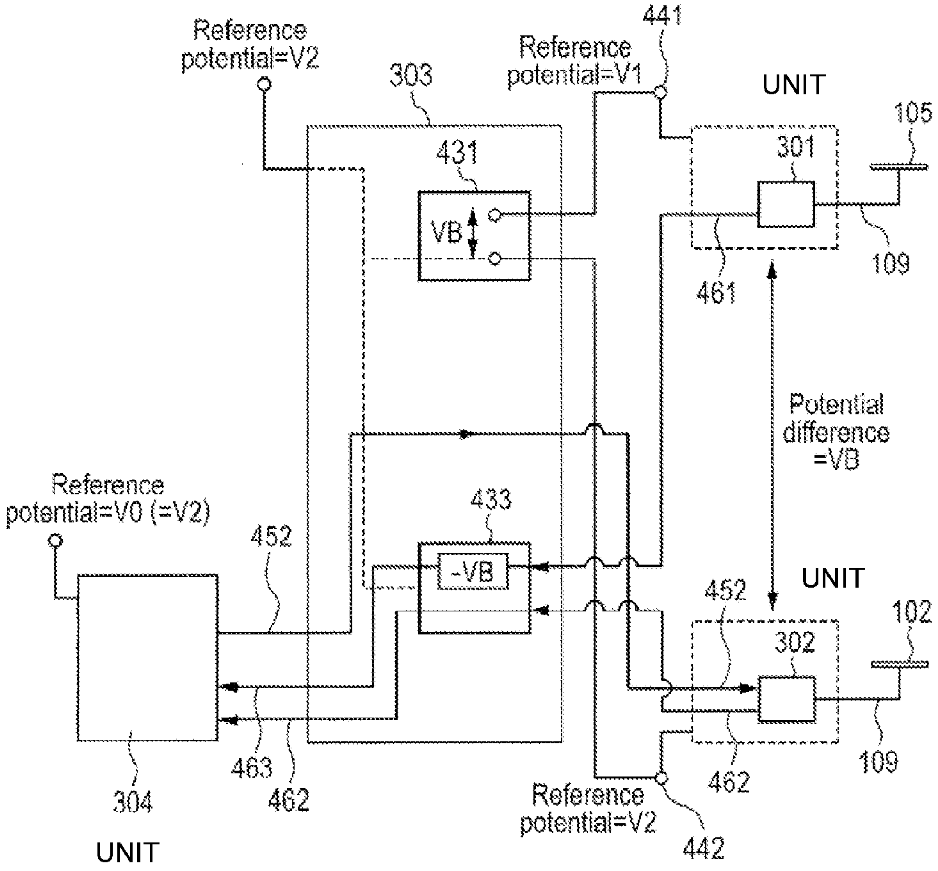
FIG. 7 is a diagram illustrating an electromechanical transducer according to a ninth embodiment.

Referring now to FIG. 7, a ninth embodiment will be described. The ninth embodiment relates to a driving and detecting unit. The rest is the same as the configuration of one of the first to the eighth embodiments. According to the driving and detecting unit of the present embodiment, a first driving and detecting unit 301 is capable of carrying out only a receiving operation, while a second driving and detecting unit 302 is capable of carrying out a transmitting and receiving operation.

If a first element is selected for carrying out the operation, then an elastic wave input from outside is received by the first element. At this time, the first driving and detecting unit 301 performs only the receiving operation, thus permitting a reduced number of components thereof. More specifically, there is no need to provide the AC potential generator 404 described in the second embodiment, and the protection switch 406 may be omitted, depending on a case. Meanwhile, the operation and the configuration when the second element carries out the transmitting and receiving operation are the same as those in other embodiments.

The reference potential of the driving and detecting unit 302 of the element that carries out the transmission and reception is preferably matched with a reference potential V0 of the switching unit 304. Hence, according to the present embodiment, the reference potential V0 of the switching unit 304 is matched with a reference potential V2 of the second driving and detecting unit 302. This makes it possible to further simplify the configuration of the drive control signal level converter 432 provided in the aforesaid potential difference setter 303 or even omit the level converter 432. According to the present embodiment, one of the elements is adapted to carry out only the receiving operation, thus making it possible to provide a capacitive electromechanical transducer capable of achieving transfer of drive and detection signals and switching operations at higher speed with a simpler configuration.

Tenth Embodiment

Figure 8A:
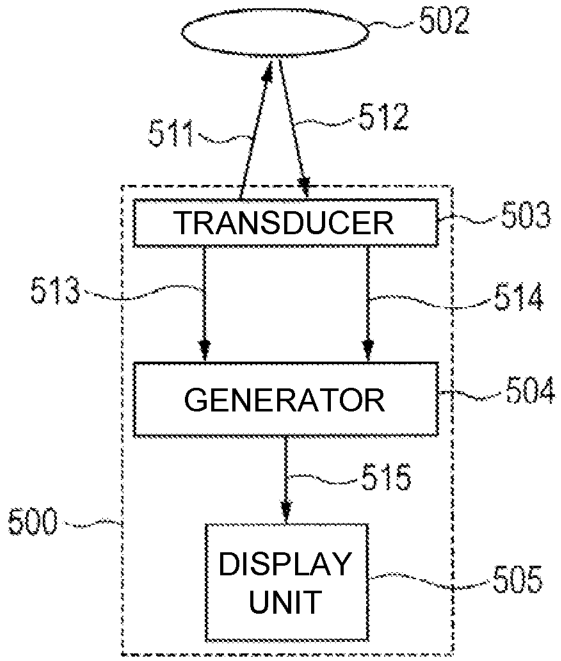
FIG. 8A is a diagram illustrating an electromechanical transducer according to a tenth embodiment.

Referring to FIG. 8A, a tenth embodiment will now be described. The tenth embodiment relates to an ultrasonic measuring apparatus using the electromechanical transducer described in the first to the ninth embodiments. In FIG. 8A, reference numeral 500 denotes an ultrasonic measuring apparatus, reference numeral 502 denotes an object to be measured, reference numeral 503 denotes a capacitive electromechanical transducer, 504 denotes an image information generator, and reference numeral 505 denotes an image display unit. Further, reference numeral 511 and 512 denote ultrasonic waves, reference numeral 513 denotes ultrasonic transmission information, reference numeral 514 denotes an ultrasonic received signal, and reference numeral 515 denotes reproduced image information.

The ultrasonic wave 511 of a transmitted signal output to the object to be measured 502 from the electromechanical transducer 503 is reflected off the surface of the object to be measured 502 due to the difference in characteristic acoustic impedance at the interface thereof. The reflected ultrasonic wave 512 is received by the electromechanical transducer 503, and the information on the magnitude, the shape and the time of the received signal is sent in the form of the ultrasonic received signal 514 to the image information generator 504. Meanwhile, the electromechanical transducer 503 sends the information on the magnitude, the shape and the time of a transmitted ultrasonic wave, namely, the aforesaid transmitted signal, to the image information generator 504 as the ultrasonic transmission information 513. The image information generator 504 generates an image signal of the object to be measured 502 on the basis of the ultrasonic received signal 514 and the ultrasonic transmission information 513 and sends the generated image signal as the reproduced image information 515 to display on the image display unit 505.

Figure 8B:
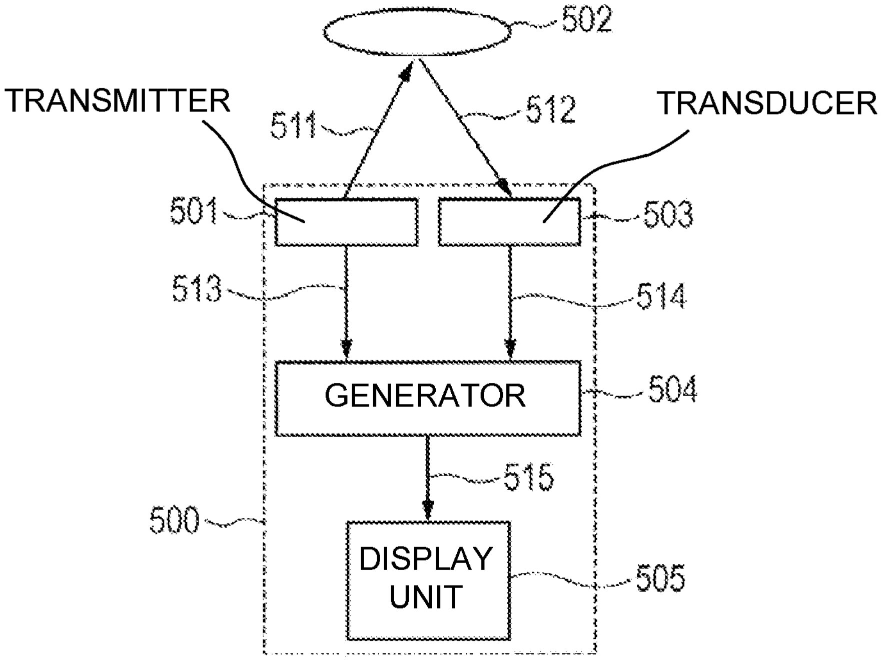
FIG. 8B is a diagram illustrating an electromechanical transducer according to the tenth embodiment.

The capacitive electromechanical transducer 503 of the present embodiment uses the CMUT described in one of the aforesaid embodiments. This makes it possible to accomplish the transmitting and receiving operation by switching between elements of different shapes, so that the transmitting and receiving operation can be achieved by using an optimum element shape that matches the object to be measured 502. Thus, more accurate information on the ultrasonic wave 512 reflected off the object to be measured 502 can be obtained, permitting more accurate reproduction of the image of the object to be measured 502. The configuration of the present embodiment is not limited to the one described above. As an alternative, another ultrasonic transmitter (elastic wave transmitter) 501 may be combined with the electromechanical transducer (elastic wave receiver) 503 according to the present invention, as illustrated in FIG. 8B.

Eleventh Embodiment

Figure 9:
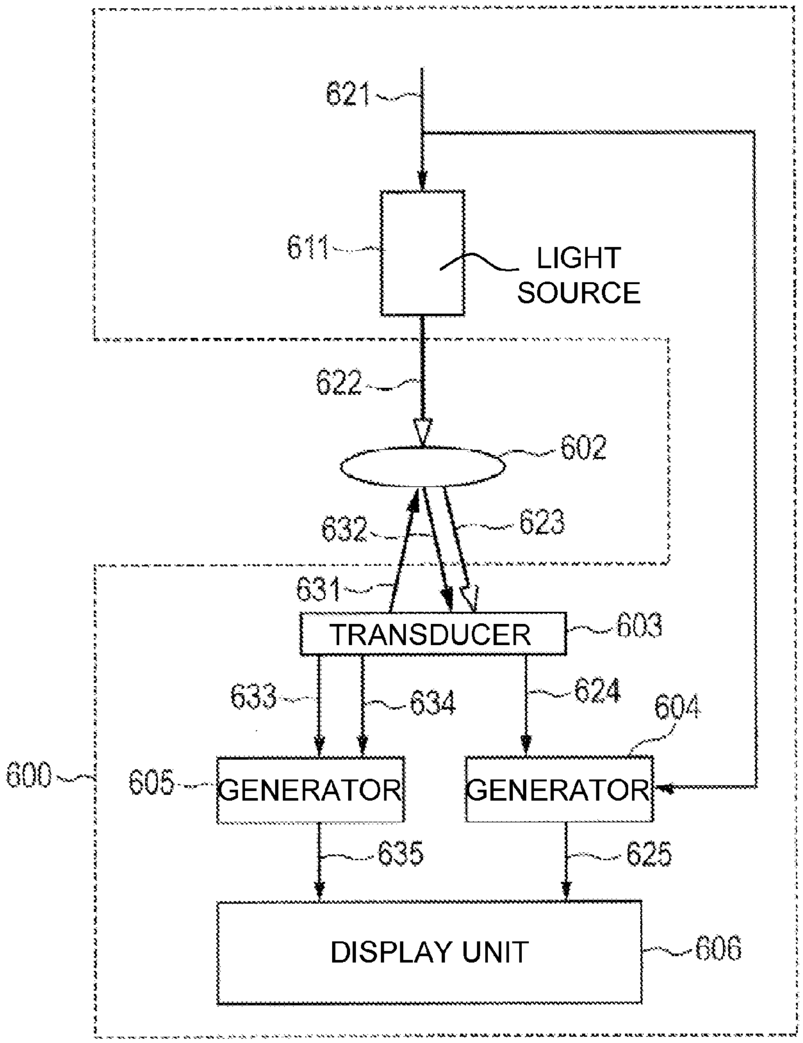
FIG. 9 is a diagram illustrating an electromechanical transducer according to an eleventh embodiment.

An eleventh embodiment will now be described with reference to FIG. 9. The eleventh embodiment relates to an ultrasonic measuring apparatus that utilizes the photo-acoustic effect of the capacitive electromechanical transducer described in the eighth and the ninth embodiments. Referring to FIG. 9, reference numeral 600 denotes an ultrasonic measuring apparatus, reference numeral 602 denotes an object to be measured, reference numeral 603 denotes an capacitive electromechanical transducer, reference numeral 604 denotes a first image information generator using photo-acoustic signals, reference numeral 605 denotes a second image information generator involved in the ultrasonic wave transmission and receiving, and reference numeral 606 denotes an image display unit. Reference numeral 611 denotes a light source, reference numeral 621 denotes a light emission instruction signal, reference numeral 622 denotes light, reference numeral 623 denotes an ultrasonic wave of a photo-acoustic signal, reference numeral 624 denotes an ultrasonic wave received signal of a photo-acoustic signal, and reference numeral 625 denotes the information on an image to be reproduced on the basis of a photo-acoustic signal. Further, reference numeral 631 denotes a transmitted ultrasonic wave, reference numeral 632 denotes a received ultrasonic wave, reference numeral 633 denotes the information on ultrasonic wave transmission, reference numeral 634 denotes an ultrasonic received signal involved in ultrasonic wave transmission and receiving, and reference numeral 635 denotes the information on an image to be reproduced on the basis of ultrasonic wave transmission and receiving.

The ultrasonic measuring apparatus 600 according to the present embodiment is characterized in that the electromechanical transducer 603 is used to carry out both the ultrasonic measurement using the photo-acoustic effect and the ultrasonic measurement using a transmitted ultrasonic wave. Using the electromechanical transducer described in the eighth and the ninth embodiments makes it possible to carry out the ultrasonic measurement utilizing the photo-acoustic effect and the ultrasonic measurement using a transmitted ultrasonic wave by switching therebetween. In the electromechanical transducer 603 according to the present embodiment, a first element is square and disposed two-dimensionally, and a first driving and detecting unit 301 is capable of performing only a receiving operation. Further, a second element is rectangular and disposed one-dimensionally, and a second driving and detecting unit 302 is capable of performing a transmitting and receiving operation (refer to FIG. 6 and FIG. 7).

First, the ultrasonic measurement utilizing the photo-acoustic effect will be described. A switching unit 304 selects the first element disposed as a two-dimensional array to carry out a detecting operation. Based on the light emission instruction signal 621, the light 622 (pulsed light) is emitted from the light source 611 to apply the light 622 to the object to be measured 602. The exposure to the light 622 causes an acoustic wave (ultrasonic wave) 623 to be generated in the object to be measured 602, and the ultrasonic wave 623 is received by the electromechanical transducer 603, which has a two-dimensional array element. The information on the magnitude, the shape and the time of the received signal is sent as the ultrasonic wave received signal 624 to the image information generator 604. Meanwhile, the light emission instruction signal 621 carrying the information on the magnitude, the shape and the time of the light 622 produced by the light source 611 is supplied to the image information generator 604 of a photo-acoustic signal. The image information generator 604 of a photo-acoustic signal generates an image signal of the object to be measured 502 on the basis of the ultrasonic wave received signal 624 and the light emission instruction signal 621, and outputs the generated image signal as the information on an image to be reproduced 625 based on the photo-acoustic signal.

A description will now be given of the ultrasonic measurement using a transmitted ultrasonic wave. The switching unit 304 selects the second element disposed as the one-dimensional array to carry out the transmitting and receiving operation. The electromechanical transducer 603 outputs (transmits) the ultrasonic wave 631 toward the object to be measured 602. An ultrasonic wave is reflected off the surface of the object to be measured 602 due to the difference in the characteristic acoustic impedance at the interface thereof. The reflected ultrasonic wave 632 is received by the electromechanical transducer 603 and the information on the magnitude, the shape and the time of the received signal is sent as the ultrasonic received signal 634 to the image information generator 605. Meanwhile, the electromechanical transducer 603 sends the information on the magnitude, the shape and the time of the transmitted ultrasonic wave as the information on ultrasonic wave transmission 633 to the image information generator 605 involved in the ultrasonic transmission and receiving. The image information generator 605 generates an image signal of the object to be measured 602 on the basis of the ultrasonic wave received signal 634 and the ultrasonic transmission information 633 and outputs the generated image signal as the information on an image to be reproduced 635 on the basis of ultrasonic wave transmission and receiving. The image display unit 605 displays the object to be measured 602 as an image on the basis of the aforesaid information on an image to be reproduced 625 based on the aforesaid input photo-acoustic signal and the information on an image to be reproduced 635 involved in the ultrasonic transmission and receiving.

The ultrasonic measuring apparatus 603 according to the present embodiment uses the electromechanical transducer 603 capable of switching between the elements of different shapes to carry out the transmitting and receiving operation. This enables the same electromechanical transducer 603 to be used to accomplish both the ultrasonic measurement utilizing the photo-acoustic effect and the ultrasonic measurement using a transmitted ultrasonic wave. Thus, the ultrasonic measurement of the object to be measured 602 can be achieved by a plurality of methods without changing the positional relationship between the electromechanical transducer 603, which his commonly used, and the object to be measured 602. This arrangement makes it possible to obtain more detailed information on the object to be measured 602, allowing an image to be reproduced with higher accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-195785, filed Sep. 8, 2011, which is hereby incorporated by reference herein in its entirety.

What is claimed is:

1. An electromechanical transducer comprising:

a plurality of cells, each of which has a vibrating film including a first electrode and has a second electrode provided opposing the first electrode with a gap therebetween;

driving and detecting means that includes first and second driving and detecting means for implementing at least one of a transmitting function which generates a potential difference between the first and the second electrodes to vibrate the vibrating film and a receiving function which detects a displacement of the vibrating film by a change in a capacitance between the first electrode and the second electrode; and switching means;

wherein a first element is formed, in which at least two cells, among a plurality of the cells, having the first electrodes thereof electrically connected and further connected to the same first driving and detecting means constitute one group, and a second element is formed, in which at least two cells, among a plurality of the cells, having the second electrodes thereof electrically connected and further connected to the same second driving and detecting means constitutes one group, and a plurality of at least one of the first and the second elements is provided, at least one cell is different between the cells constituting the first element and the cells constituting the second element, and the switching means switches the driving and detecting means for implementing the function between the first driving and detecting means and the second driving and detecting means at the time of carrying out a transmitting and receiving operation.

2. The electromechanical transducer according to claim 1, wherein, in the case where the switching means switches to the first driving and detecting means for carrying out the transmitting and receiving operation, the second driving and detecting means fixes the second electrode to a reference potential of the second driving and detecting means, and the first electrodes are connected, by each first element, to either one of a drive circuit that implements the transmitting function of the first driving and detecting means and a detection circuit that implements the receiving function by the first driving and detecting means, and in the case where the switching means switches to the second driving and detecting means for carrying out the transmitting and receiving operation, the first driving and detecting means fixes the first electrode to a reference potential of the first driving and detecting means, and the second electrodes are connected, by each second element, to either one of a drive circuit that implements the transmitting function of the second driving and detecting means and a detection circuit that implements the receiving function by the second driving and detecting means.

3. The electromechanical transducer according to claim 1, wherein the first and the second elements respectively have rectangular regions, and the length of a short side of the region of the first element and the length of a short side of the region of the second element are different.

4. The electromechanical transducer according to claim 1, wherein the first and the second elements respectively have rectangular regions, and the regions are arranged such that the direction of a long side of the region of the first element and the direction of a long side of the region of the second element are orthogonal to each other.

5. A measuring apparatus comprising:

the electromechanical transducer according to claim 1, which carries out at least one of the transmission of an elastic wave to an object to be measured by a transmitted signal and the receiving of a signal of an elastic wave from the object to be measured; and an image information generating apparatus which generates image information of the object to be measured by using at least one of a transmitted signal and a received signal from the electromechanical transducer.

6. A measuring apparatus comprising:

the electromechanical transducer according to claim 1, which carries out at least one of the transmission of an elastic wave to an object to be measured by a transmitted signal and the receiving of a signal of an elastic wave from the object to be measured;

a first image information generating apparatus which generates image information of the object to be measured by using a received signal obtained by receiving, at the electromechanical transducer, an acoustic wave, which is generated by light applied to the object to be measured; and a second image information generating apparatus which generates image information of the object to be measured by using a received signal obtained by receiving, at the electromechanical transducer, an elastic wave from the object to be measured, to which the elastic wave has been applied by the electromechanical transducer.

7. The measuring apparatus according to claim 6, wherein the first image information generating apparatus generates the image information of the object to be measured by using a received signal obtained by the electromechanical transducer, in which the driving and detecting means that is to carry out the function has been switched to one of the first driving and detecting means and the second driving and detecting means by the switching means, and the second image information generating apparatus generates the image information of the object to be measured by using a received signal obtained by the electromechanical transducer, in which the driving and detecting means that is to carry out the function has been switched to the other of the first driving and detecting means and the second driving and detecting means by the switching means.

8. A measuring apparatus capable of performing measurement using an acoustic wave by a photo-acoustic effect and measurement using an ultrasonic wave, comprising:

a plurality of cells, each of which has a vibrating film including a first electrode and has a second electrode provided opposing the first electrode with a gap therebetween;

a first driving and detecting circuit for implementing a receiving function which detects a displacement of the vibrating film;

a second driving and detecting circuit for implementing a transmitting function which generates a potential difference between the first and the second electrodes to vibrate the vibrating film and a receiving function which detects a displacement of the vibrating film;

a switching circuit;

wherein the switching circuit switches between the first driving and detecting circuit and the second driving and detecting circuit so that the measuring apparatus uses the first driving and detecting circuit on the measurement using the acoustic wave and the measuring apparatus uses the second driving and detecting circuit on the measurement using the ultrasonic wave.

9. The measuring apparatus according to claim 8, wherein the first driving and detecting circuit is electrically connected to one of the first and second electrodes, and the second driving and detecting circuit is electrically connected to the other of the first and second electrodes.

10. The measuring apparatus according to claim 8, further comprising a light source, wherein the acoustic wave is an acoustic wave that is generated when a pulsed light from the light source is applied to an object to be measured.

11. The measuring apparatus according to claim 8, wherein the plurality of cells comprises a first cell group and a second cell group including cells that are not included in the first cell group, the first driving and detecting circuit is electrically connected to the first cell group, and the second driving and detecting circuit is electrically connected to the second cell group.

12. The measuring apparatus according to claim 8, wherein the first and second driving and detecting circuits implement a receiving function which detects a displacement of the vibrating film by a change in a capacitance between the first electrode and the second electrode.

* * * * *